April 30, 1963 E. LONG ETAL 3,087,884
MEANS FOR SHUTTING DOWN NUCLEAR REACTORS
Filed July 1, 1959 2 Sheets-Sheet 2
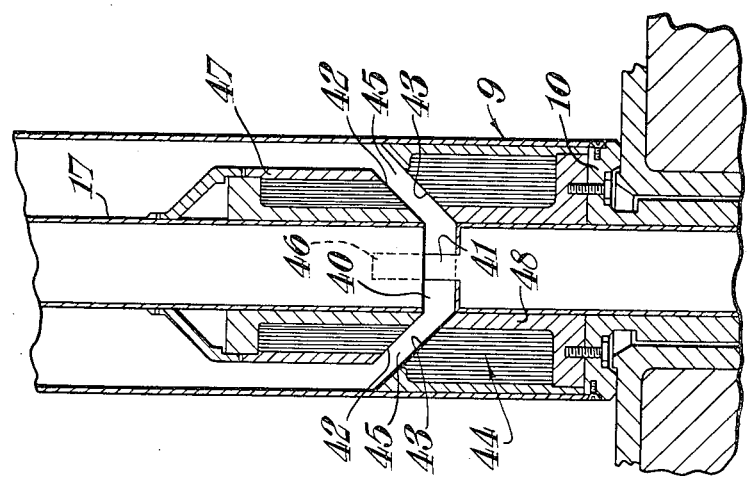
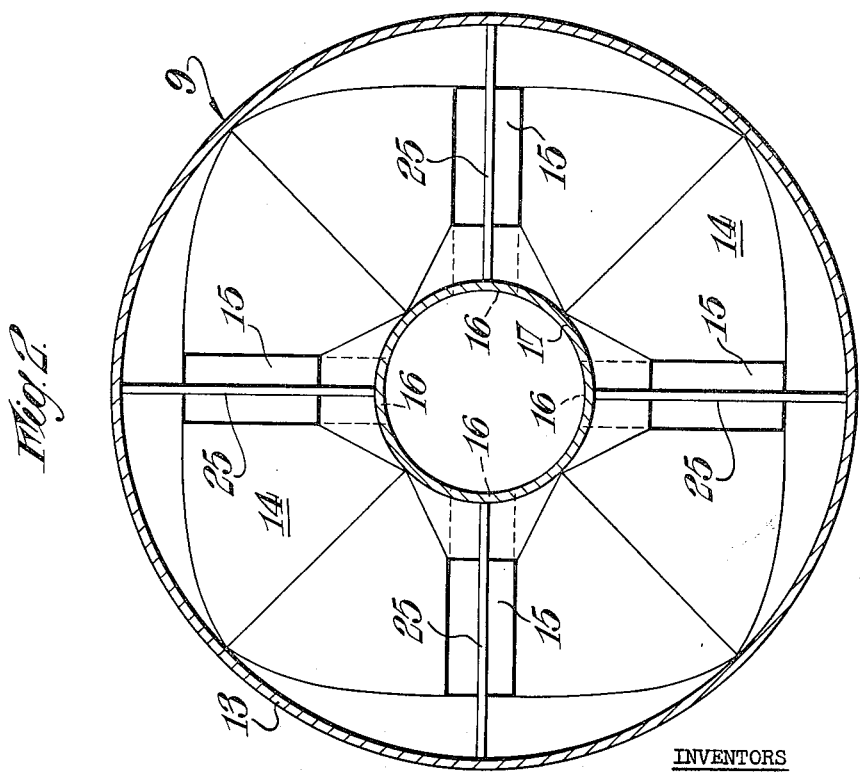
INVENTORS
EVERETT LONG
FRANK GEOFFREY GREENHALGH
LAURENCE HACK
BY ited States Patent Office 3,087,884
Patented Apr. 30, 1963

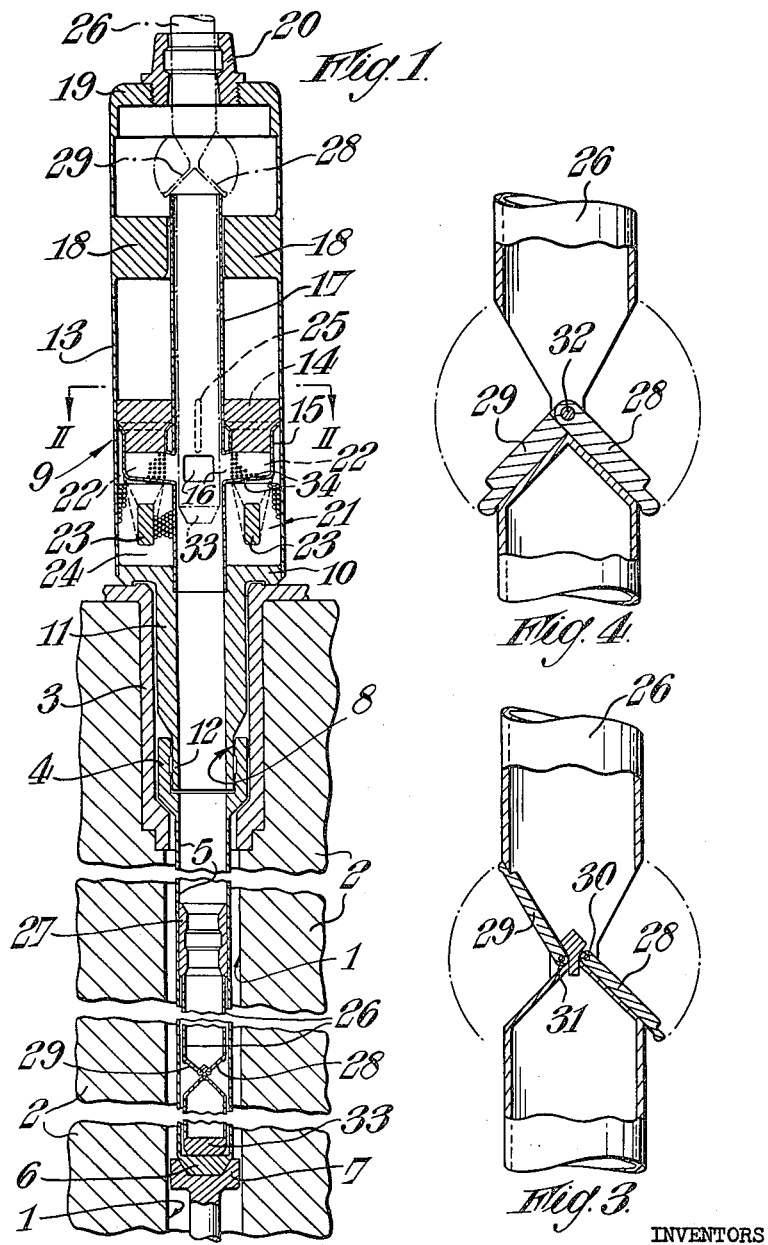

1

3,087,884
MEANS FOR SHUTTING DOWN NUCLEAR REACTORS
Everett Long, Culcheth, near Warrington, Frank Geoffrey Greenhalgh, Wigan, and Laurence Hack, Baguley, Manchester, England, assignors to the United Kingdom Atomic Energy Authority, London, England
Filed July 1, 1959, Ser. No. 824,247
Claims priority, application Great Britain July 8, 1958
4 Claims. (Cl. 204—193.2)

This invention relates to means for shutting down nuclear reactors.

It is common practice in nuclear reactor technology to provide an emergency shut-down consisting of control rods which can fall or are projected into the reactor core the control rods being of or containing material which has a high neutron absorption. However, if the pressure vessel ruptures, for example on occurrence of a seismic disturbance, disarrangement or misalignment of the core can result, which could lead to failure of the emergency shut-down to operate. Some form of secondary shut-down is therefore desirably provided which is capable of being brought into operation effectively if the normal emergency shut-down becomes inoperable for the above or any other reason.

The choice of a suitable neutron-absorbing medium for use with secondary shut-down is governed by the conditions likely to be encountered should the use of the device become necessary. Where loss of coolant circulation has occurred and given rise to high temperatrues tending to distort the reactor core, the use of a gaseous or liquid medium introduces risks which are considered to be too great to merit their choice. A gas is difficult to place in position quickly, and furthermore lack of sufficient concentration for effectiveness can occur where the core has become distorted and allows the gas to disperse and leak out of the core. A suitable liquid would probably boil at the abnormally high temperatures likely to be met where use of secondary shut-down becomes imperative, the gas produced, even if itself an effective neutron absorber, being subject to the disadvantages hereinbefore set forth. The choice of material therefore appears to be confined to solid material in a form capable of being introduced into the reactor core notwithstanding possible distortion thereof. Furthermore, means for effecting secondary shut-down is preferably divorced from the pressure vessel so that it can be operated even if rupture of the pressure vessel has occurred; it should remain relatively stable despite what abnormal (although generally foreseeable) conditions may appertain through mishap.

A safety device for a research reactor has been disclosed which consists of a hopper mounted in shielding above a reactor core, the hopper being charged with boron-steel shot which can be released by mechanical means to fall into a well disposed in graphite surrounding the reactor core.

According to the invention, apparatus for shutting down a nuclear reactor includes a tube adapted to be removably accommodated in the reactor core, the tube having releasable closure means for its lower or non-charging end which is normally closed, and means for charging a multiplicity of neutron absorbing balls into the said tube on operation, the said tube being withdrawable from the core

2 and its lower end openable for recovery of the said bodies after operation.

The apparatus preferably has a magazine for the said balls, in which the latter can be held in readiness for charging, having one or more oultets communicating with the charging end of the said tube, removable restraint means being provided for preventing the said bodies from passing through the or each outlet until the apparatus is operated.

The said restraint means may be the application of a magnetic field across the or each outlet, the said balls then being of material which is magnetic but which preferably has a low retentivity and coercivity, and removal of the magnetic field serving to remove the restraint and allow the bodies to pass through the or each outlet.

The charging end of the said tube is preferably provided with a fitting which enables it to be engaged and gripped for withdrawal, removal or replacement by a charging or discharging grab normally employed in the operation of the reactor.

A constructional example of apparatus according to the invention will now be particularly described with reference to the accompanying drawings (wherein like reference numerals refer to like parts) in which—

FIGURE 1 is a fragmentary side view in medial section of apparatus for secondary shut-down in its operative position, FIGURE 2 is a plan view, in section on line II—II of FIGURE I, drawn to a larger scale than FIGURE 1, FIGURE 3 is a fragmentary side view in section, drawn to a larger scale than FIGURE 1, illustrating a detail, FIGURE 4 is a similar view to FIGURE 3 and illustrates a modification, and FIGURE 5 is a similar view to FIGURE 1 and illustrates another modification.

Referring to FIGURES 1 to 4, in the construction of apparatus for secondary shut-down shown therein, as applied by way of example to a nuclear reactor having its moderator structure of graphite in which are formed substantially vertical apertures provided for the usual control rods or shut-down rods, one such aperture 1 in the moderator structure 2 has a charge pan 3 at its upper end, the lower end of which is engaged by an upper portion 4 of enlarged diameter of a long tube 5 whose lower end is closed by a plug 6 and rests on a stool 7 which is supported at the lower end of the reactor core. The portion 4 of the tube 5 is internally recessed at 8 to provide location for the lower end of a magazine assembly generally indicated by the reference numeral 9. The magazine assembly 9 has a flange 10 which seats on the charge pan 3, an elongated tubular portion 11 which fits within the bore of the charge pan 3, and an end portion 12 of reduced diameter located in the iternal recess 8 of the tube portion 4. The remainder of the magazine assembly consists of a container 13 having deflector chutes 14 leading to four outlet pipes of rectangular cross-section which are bent through nearly a right angle (see particularly FIGURE 1) and have orifices 16 opening into a central tube 17 extending both upwardly and downwardly relative to the orifices 16. Peripherally spaced supports 18 for the upper end of the tube 17 extend from the walls of the container 13, and the container 13 is provided with a cap 19 provided with a bored spigot 20 shaped to provide an engagement for the usual charging or discharging grab. Mounted on the flange 10 of the assembly 9 are four electromagnetic devices 21 having pole pieces 22 situated at either side of the bent portion of each pipe 15. The yoke 23 of each pair of pole pieces 22 has coils 24 wound on it.

Disposed within the tube 5 is an inner tube 26 whose upper end is spaced below the portion 4 and is formed with a thickened portion 27 intended to provide engagement for the said charging or discharging grab. The tube 26 is a clearance fit within the tube 5 and is provided towards its lower end with opposed openable flaps 28, 29 either separately pivoted at 30, 31 respectively as shown in FIGURE 3, or pivoted on a single pivot pin 32, see FIGURE 4. The flaps 28, 29 are so constructed that when closed they do not project substantially beyond the external diameter of the tube 26, but when in the open position, they do project beyond that diameter. The end portion of the tube 26 is elongated beyond the flaps 28, 29 and has an end plug 33 engageable with the plug 6 of the tube 5 in the operative position of the tube 26. The tube 26 can be withdrawn out of the tube 5 into the tube 17 and into a position which is shown in dot-and-dash lines in FIGURE 1, by the discharge grab, the flaps 28, 29 being retained in their closed position during withdrawal but on passing beyond the upper end of the tube 17 they fall open into the position shown in dot-and-dash lines in FIGURE 1.

The apparatus operates as follows: the magazine container 13 is charged with a large number of boron steel balls, conveniently of 1/8" diameter (a few of which are illustrated in FIGURE 1 and designated 34), discharge of which through the pipes 15 and orifices 16 into the interior of the central tube 17 is prevented so long as the coils 24 are energised to provide a magnetic field between pairs of pole pieces 22. On operation of the shut-down device becoming necessary, the coils 24 are de-energised, the magnetic field being thereby removed and the balls 34 allowed to fall from the magazine container 13 through the pipes 15 and orifices 16 into the central tube 17 and from thence down into the tube 26, being prevented from escaping therefrom by the flaps 28, 29 which are closed. The balls 34 form a column within the tube 26 and are effective in the same manner as a solid shut-down rod of the same diameter and height in absorbing neutrons and effecting shut-down. When it is desired to render the shut-down device inoperative, the tube 26 has its portion 27 engaged by the usual discharge grab and is drawn bodily upwardly into the position shown in dot-and-dash lines in FIGURE 1, the flaps 28 and 29 falling open as soon as the restraining influence of central tube 17 ceases to be exerted, and the flaps 28, 29 then serve to allow the balls 34 to run out of the tube 26 and to deflect them into the magazine container 13. The elongated end portion of the tube 26 covers the orifices 16 and prevents the balls 34 from passing into the central tube 17. Meanwhile the coils 24 have bene re-energised to re-establish the magnetic field and again hold the balls 34 against discharge from the magazine container 13. The tube 26 is then returned to its operative position within the reactor core, the flaps 28, 29 being automatically closed as they re-enter the tube 17 and kept in their closed position by contact with the wall of the tube 17, the bore of the portion 11, and the wall of the tube 5 successively as the tube 26 is passed downwardly.

Non-magnetic partitioning plates 25 are arranged radially relative to the central tube 17 so as to bisect the pipes 15 in the plan view sense (see FIGURE 2), their purpose being to confine the magnetic flux produced by the pairs of pole pieces 22 to a limited area by dividing the passages immediately above the pole pieces 22.

As an indication of suitable relative dimensions for the magazine container 13 and inner tube 26 diameters, the height of the magazine container 13 may be 14 inches and can contain enough balls to produce a 14 foot column of balls in the inner tube 26.

The magazine can be recharged under pressure circulation of coolant. The ability to recharge under pressure provides a ready facility for testing of the device.

In a modification (not shown), the discharge orifices 16 with their communicating pipes 15 may be staggered instead of being at the same level as shown in FIGURE 1. This expedient serves to produce more of a "flow" of balls down the tube when the device is operated than the illustrated construction, and may enable balls of larger diameter to be employed if desired. In the modification shown in FIGURE 5, the apparatus is similar to that described with reference to FIGURES 1 to 4 except that the magazine has an annular opening 40 into the central tube 17 broken only by diametrically opposed portions 41 of the wall of the tube 17 (one portion 41 only being shown in FIGURE 4). Poles 42, 43 of an annular electromagnet 44 are arranged at either side of a conical passage 45 leading to the opening 40, baffles 46 of nonmagnetic material being arranged in the passage 45 in register with the portions 41 and serving for support of the pole pieces 42 which are mounted in a casing 47 embracing the central tube 17. The pole pieces 43 are supported by a carrier 48 secured to the flange 10 of the magazine assembly 9. Operation is similar to that described with reference to FIGURES 1 to 4. The modification enables balls of larger diameter (up to 1/4") to be employed.

In a power producing nuclear reactor, sufficient units of apparatus according to the invention are employed to reduce reactivity to an extent which will ensure shut down, and concentration particularly in the central region of the core is preferably provided. In a typical example, a core 31 feet in diameter and possessing 1696 fuel element channels and 48 control rods employs 10 units of apparatus as hereinbefore described.

We claim:
1. A shut-down apparatus for a nuclear reactor comprising a magazine containing a plurality of neutron absorbing balls, a tube member for insertion in a core channel, the tube member having a feed orifice in the wall thereof spaced from one end of the tube member, means defining a feed pipe connecting a magazine with the feed orifice, means for applying a magnetic field across the feed pipe to restrain flow of the neutron absorbing balls therethrough, an inner tube member slidably disposed in the tube member for receiving the neutron absorbing balls, closure means on one end portion of the inner tube member for closing the opening of the tube end, said closure means being engageable with the tube member to close the inner tube end opening, and means for de-energizing the restraining magnetic field when both end portions of the inner tube member are disposed between the feed orifice and said end of the tube member spaced therefrom.

2. A shut-down apparatus according to claim 1, wherein said closure means is disengageable from the tube member to open said inner tube end opening and further comprising means for returning the neutron absorbing balls to the magazine when both end portions of the inner tube member are disposed outside the sleeve member.

3. A shut-down apparatus according to claim 1, wherein the closure means include a pivotally mounted member engageable with the tube member to close the inner tube end opening.

4. A shut-down apparatus according to claim 1, wherein the magazine is in the form of a jacket disposed about the tube member adjacent the other end thereof.

References Cited in the file of this patent

UNITED STATES PATENTS

| | | |
|---|---|---|
| 564,859 | Whiture et al. | July 28, 1896 |
| 998,486 | Fauntleroy | July 18, 1911 |
| 1,259,788 | Sakinger | Mar. 19, 1918 |
| 1,392,413 | Gow | Oct. 4, 1921 |
| 1,491,600 | Fernow | Apr. 22, 1924 |

(Other references on following page)

UNITED STATES PATENTS

| | | |
|---|---|---|
| 2,640,605 | Chatterton | June 2, 1953 |
| 2,773,823 | Goett | Dec. 11, 1956 |
| 2,782,158 | Wheeler | Feb. 19, 1957 |
| 2,917,444 | Dreffin | Dec. 15, 1959 |
| 2,930,744 | Shillitto | Mar. 29, 1960 |
| 2,983,658 | Hyman et al. | May 9, 1960 |

FOREIGN PATENTS

| | | |
|---|---|---|
| 717,326 | Great Britain | Oct. 27, 1954 |
| 1,211,440 | France | Oct. 12, 1959 |
| 1,071,245 | Germany | Dec. 17, 1959 |

OTHER REFERENCES

NAA-SR-276, issued 1953; see I.A.

NAA-SR-1049, USAEC report issued September 1, 1954, declassified March 15, 1957.

ANL-5244 (Del. 2), issued November 1955, declassified March 18, 1957, p. 8.

KAPL-1528 (TID-4500, 11th ed.), issued January 17, 1956; unclass. "An Electronic Trip System for Reactor Protection, Model D," p. 11.

German application, 1,052,000, printed March 5, 1959.